(12) United States Patent
Armbruster

(10) Patent No.: US 6,464,921 B1
(45) Date of Patent: Oct. 15, 2002

(54) METHOD FOR MANUFACTURING A TUBE SHOULDER

(75) Inventor: Rainer Armbruster, Wolfach (DE)

(73) Assignee: Foboha GmbH, Haslach (DE)

( * ) Notice: Subject to any disclaimer, the term of this patent is extended or adjusted under 35 U.S.C. 154(b) by 0 days.

(21) Appl. No.: 09/505,815

(22) Filed: Feb. 17, 2000

(30) Foreign Application Priority Data

Feb. 18, 1999 (EP) .............................................. 99103183

(51) Int. Cl.⁷ .............................. B28B 5/06; B28B 7/04
(52) U.S. Cl. ........................ 264/255; 264/250; 425/443; 425/112; 425/125
(58) Field of Search ............................... 264/255, 250, 264/245, 246, 247, 259, 260; 425/112, 125, 443

(56) References Cited

U.S. PATENT DOCUMENTS

| | | | |
|---|---|---|---|
| 3,186,601 A | * | 6/1965 | Marchak |
| 3,465,917 A | * | 9/1969 | Saeki |
| 3,565,293 A | | 2/1971 | Schultz |
| 3,988,413 A | * | 10/1976 | Gaudet et al. |
| 4,185,757 A | | 1/1980 | Schultz |
| 4,275,864 A | | 6/1981 | Richards |
| 4,492,548 A | * | 1/1985 | Hubert |
| 5,030,406 A | * | 7/1991 | Sorensen |

FOREIGN PATENT DOCUMENTS

| | | |
|---|---|---|
| EP | 0 130 239 A1 | 1/1985 |
| GB | 1118632 | 7/1968 |

* cited by examiner

Primary Examiner—Jan H. Silbaugh
Assistant Examiner—Geoffrey P. Shipsides
(74) Attorney, Agent, or Firm—Rankin, Hill, Porter & Clark LLP

(57) ABSTRACT

A method for manufacturing a multilayer tube shoulder wherein a first material component is injected into a cavity (22) and then removed from the cavity on a support (12) while in a partly-plastic state. Thereafter, following insertion of the first material component into a second cavity (23), a second material component is injected around the first material component, and thereby leads to a positive connection between the first and second material components.

2 Claims, 1 Drawing Sheet

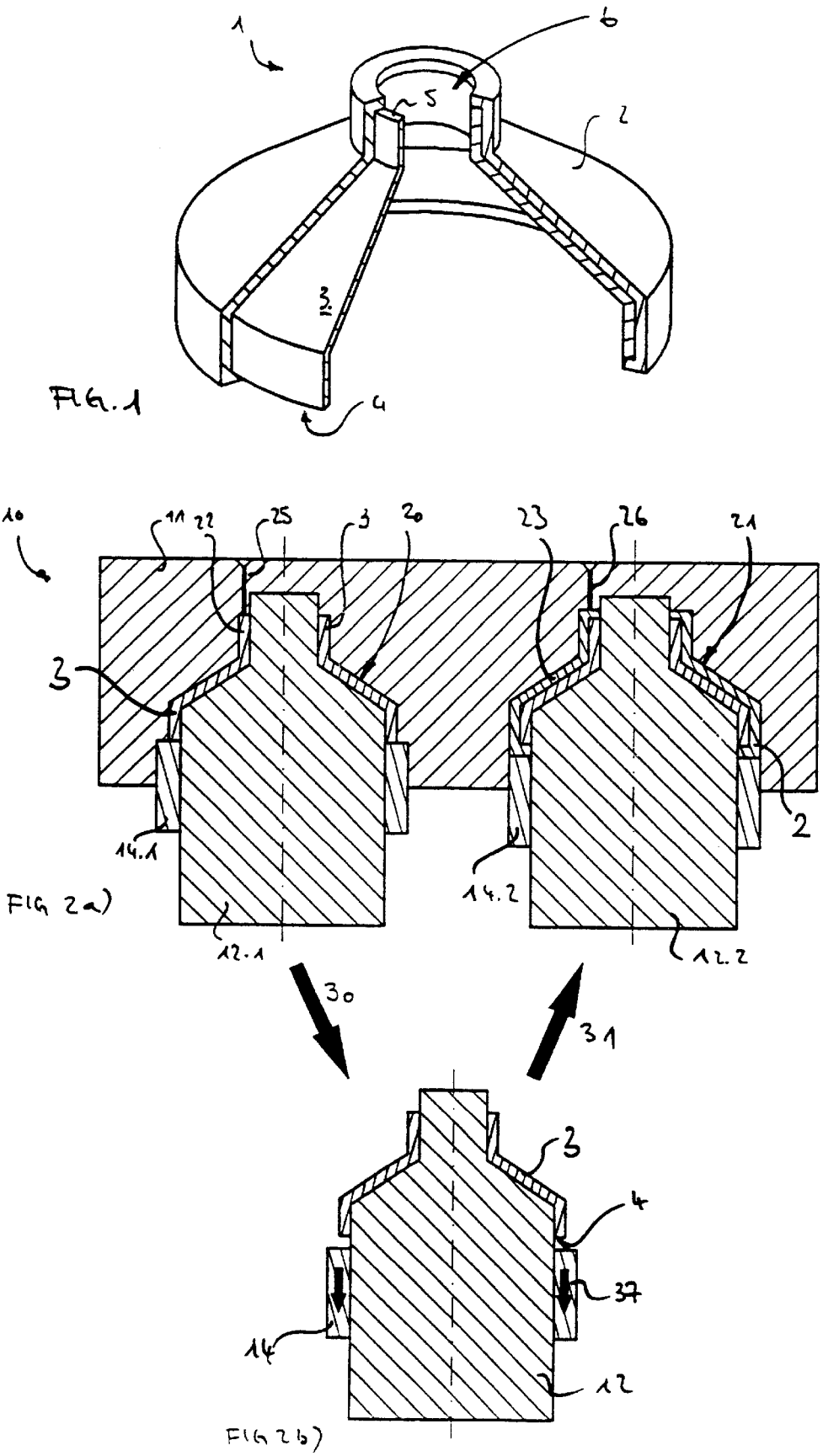

METHOD FOR MANUFACTURING A TUBE SHOULDER

BACKGROUND OF THE INVENTION

The present invention relates to a multilayer tube shoulder for a tube and to a method for the manufacture of such tube shoulders according to the preambles of the independent claims.

The prior art discloses numerous tube shoulders for tubes. Currently, such tube shoulders are almost exclusively made from thermoplastic material by injection molding and are then welded to the tubular tube body in a further operation.

Certain plastics, such as polyethylene (PE), have a considerable permeability for oxygen, carbon dioxide and odorous/aromatizing substances. In the case of tube shoulders made from these materials, undesired substances diffuse or pass out of the tube into the environment or pass from the environment into the tube, which is prejudicial to the substance introduced into the tube. In order to prevent this harmful permeability, tube shoulders generally have a two-layer structure, comprising an outer, shaping layer and an inner barrier layer.

The material generally used for the shaping layer is polyethylene (PE), while the barrier layer material is polyethylene terephthalate (PET). The fact that these materials do not adhere to one another constitutes one of the main problems in the rational, economic manufacture of tube shoulders.

The use of multilayer tube shoulders of PE and PET has been adopted. Thus, the prior art discloses numerous attempts to rationally and economically manufacture known, multilayer tube shoulders. U.S. Pat. No. 4,185,757 discloses one such attempt. However, none of the known solutions is completely satisfactory. Since tube shoulders are mass produced articles, the price is mainly determined by two factors: cost/material consumption and cycle time for manufacture. The tube shoulders known from the prior art on the one hand have an excessive material consumption, which has a negative effect on the consumption of resources, and therefore costs and environmental compatibility. On the other hand they cannot be manufactured rationally, because they require long cycle times. In fact, certain tube shoulders even require several injection molds and several operations, which amounts to a poor utilization of the machines and molds.

The problem of non-mutually adhering materials has in the prior art led to inefficient or even impracticable solutions. As e.g. in U.S. Pat. No. 4,185,757, these are based on filigree undercuts and keys or wedges, which are intended to bring about a positive connection between the inner barrier layer and the outer, shaping layer of a tube shoulder. These undercuts and keys e.g. comprise mutually corresponding grooves and ribs, which are generally made at right angles to the symmetry axis of the tube shoulder and are so constructed that they must be forcibly demolded.

Another multilayer tube shoulder is described in European patent application EP-130 239. This application teaches a multilayer tube shoulder having an inner barrier layer adhering by friction to an outer, shaping layer. This arrangement is unsatisfactory for various reasons. Firstly, the two layers must be combined in a separate operation. Secondly, there is no reliable hold between the two parts. Thirdly, the parts require increased manufacturing precision, which, inter alia, takes into account the differing shrinkage behavior of the materials.

The parts of the above-described tube shoulders can generally only be further processed after complete cooling. It is also necessary to manually join the individual parts in a separate operation. Thus, the prior art arrangements lead to the manufacturing process for the corresponding tube shoulders being directly and completely decelerated.

SUMMARY OF THE INVENTION

The present invention is directed toward a tube shoulder and method for making a tube shoulder that avoids the disadvantages discussed in conjunction with the aforementioned prior art. On the one hand, by means of the present invention, drastic material reductions are possible and, on the other hand, the manufacturing time is greatly reduced and optimized, leading to a better utilization of the invested resources.

Compared with the prior art the invention has two vital advantages. On the one hand the material consumption of a two-layer tube shoulder is massively reduced and on the other the cycle time during manufacture is drastically decreased.

The invention disclosed here is also suitable for integrally joining a tube body to the tube shoulder in a first step. This tube body can be supplied as an extraneous part from the outside to the processing operation. This additional step advantageously takes place in a further cavity or is combined with one of the steps in which the first or second material component is produced.

The invention is described in greater detail hereinafter relative to a preferred embodiment and the attached drawings, wherein show:

FIG. 1 Diagrammatically a preferred embodiment of a tube shoulder in a perspective sectional view.

FIG. 2 Diagrammatically the sequence of a tube shoulder manufacturing process.

FIG. 1 shows a preferred embodiment of a tube shoulder 1 in a perspective sectional view. The tube shoulder 1 comprises an outer layer 2 and an inner barrier layer 3. Preferably the outer layer 2 is of polyethylene (PE) and the barrier layer 3 of polyethylene terephthalate (PET). The outer layer 2 is primarily used for shaping the tube shoulder 1 and the barrier layer 3 serves to seal the tube shoulder 1. The two materials of the outer layer 2 and barrier layer 3 are typically not meltable or fusible with one another. In order, despite this, to bring about a mechanical connection, the outer layer 2 engages round the barrier layer 3, here at a lower face 4 and an upper face 5, so that a large-area, positive connection is formed between the outer layer 2 and the barrier layer 3. The use of the method described relative to FIG. 2 is made possible by the represented embodiment of the tube shoulder 1 as a result of the inventive construction, which deliberately avoids small undercuts and the like.

As a result of the inventive construction of the tube shoulder 1, in which all the mechanical connections between the outer layer 2 and barrier layer 3 are in large-area form, it is possible to release the barrier layer in a mould 10 whilst the material of said barrier layer 3 is still partly plastic. With filigree or difficultly demouldable undercuts (e.g. undercuts which must be forcibly demoulded) this is not possible. The presently disclosed invention is therefore based on a design of tube shoulders permitting an optimum, large-area and unforced demoulding, without undercuts. The individual steps of the manufacturing process are diagrammatically represented in FIGS. 2a) and 2b).

FIG. 2a) diagrammatically shows a sectional representation through an injection mould 10 for the manufacture of the tube shoulder 1 according to FIG. 1. The injection mould 10 here comprises a base body 11, which has two openings 20 and 21. Two, here identical, rotationally symmetrical cores 12.1 and 12.2 and two identical, annular release elements 14.1 and 14.2 engage from below and in sealing manner in the openings 20 and 21, so as to form a first cavity 22 and a second cavity 23. The first cavity 22 corresponds to the negative of a barrier layer 3 according to FIG. 1. The second cavity 23 corresponds to the negative of a barrier layer 3 and an outer layer 2.

By means of a first runner 25 molten plastic of a first material component, preferably PET, is injected into the first cavity 22, so as to form a barrier layer 3 according to FIG. 1. Before the plastics material of said barrier layer 3 has cured, the core 12, release element 14 and partly plastic barrier layer 3 are drawn out of the opening 20. This process is illustrated by an arrow 30.

As shown in FIG. 2*b*), subsequently the release element 14 is so displaced (arrow 37), that there is a release of a lower surface 4 of the barrier layer 3. The core 12, release element 14 and barrier layer 3 are subsequently sealingly inserted into the second opening 21 of the injection mould 10 (FIG. 2*a*). This is diagrammatically represented by an arrow 31. By means of a second runner 26 a second material component is injected round the released barrier layer 3 formed by the first material component that a strong, mechanical connection is formed. At least one face preferably an annular face 4, 5 (cf. FIG. 1) serves as a mechanical stop. The second material component forms an outer layer 2 according to FIG. 1.

The entire sequence is represented here in a highly diagrammatic manner and is in practice advantageously incorporated into a reversing mould with typically two cavities 20 and two cores 14.1 and 14.2. The two cores 14.1 and 14.2 are simultaneously used. As a result of the tube shoulder design according to the invention and the resulting unforced release of the first material component in a partly plastic state, compared with conventional tube shoulders, it is possible to achieve a massive reduction of cycle times and material consumption. The barrier layer can be made very thin, because the core 14 acts as a shaping support.

At the end of a manufacturing cycle the release element 14 additionally serves as an ejection aid for the finished tube shoulder 1.

To achieve a better sealing of the cavities 22 and 23, the faces of the release elements 14.1, 14.2 and the cavities 22, 23, which are in functional combination with one another, are advantageously conically constructed.

The here described, very rapidly performed manufacturing process is additionally, and as a function of the dimensions of the tube shoulder 1 to be manufactured, controlled by the cooling of the core 14 and the injection mould 1. Advantageously gas or liquid cooling systems are used.

For esthetic reasons it is possible to use differently coloured or transparent plastics, in order to achieve special optical effects. This can e.g. be advantageous if the barrier layer 3 is so positioned in the vicinity of an outlet port 6 (cf. FIG. 1) that it is visible from the outside for the user. The outlet port 6 can also have a non-circular cross-section, so that a pattern can be impressed on the filled material passing out.

What is claimed is:

1. A method for manufacturing a multilayer tube shoulder (1), comprising the steps of:

injecting a first material component into a first cavity (22) onto a support (12), said support including a release element;

removing the support with the first material component from said first cavity while said first material component is in a partially plastic state;

moving said release element relative to said first material component so that said release element is spaced from and exposes a face of said first material component;

inserting said support, said release element, and said partially plastic first material component into a second cavity (23), said second cavity being dimensioned such that, after receipt of said first material component, a free space is provided such that said face of said first material component remains exposed;

injecting a second material component into said second cavity, into said space between said release element and said first material component, and onto said first material component, said face being engaged by said second material component and serving as a mechanical stop for the first material component with respect to the second material component, so that there is a positive connection between the first and second material components.

2. The method for manufacturing a tube shoulder according to claim 1, wherein, when injecting the second material component, a tube body is integrally connected to the tube shoulder (1).

* * * * *

UNITED STATES PATENT AND TRADEMARK OFFICE
CERTIFICATE OF CORRECTION

PATENT NO.    : 6,464,921 B1
DATED         : October 15, 2002
INVENTOR(S)   : Armbruster It is certified that error appears in the above-identified patent and that said Letters Patent is hereby corrected as shown below:

<u>Column 2,</u>
Line 15, after "resources.", insert:

--Unlike in the prior art, which is generally based on a forced demolding (removal from the mold) of cooled parts, in the present invention there is no need to wait until the material of the first component has cooled. Instead, further processing takes place when the first part is in the uncured state. Accordingly, the present method provides considerable time saving while greatly reducing material consumption because the layers of the tube shoulder disclosed here, unlike with the conventional tube shoulders, are made significantly thinner.

In further accordance with the present invention, further processing the first component of the tube shoulder can be done before the material has completely cured. Therefore, the present production-optimized design of the tube shoulder does not, unlike the known designs, constrain the production cycles. Undercuts or filigree keys, which are difficult to remove from the mold or which must even be forcibly de-molded, are not needed in the present invention. Rather, the inventive design utilizes generously dimensioned contact faces between the individual parts of the tube shoulder that are arranged so that no forced de-molding is necessary and, therefore, leads to a very simple construction of the injection mold. The design is also optimized such that material shrinkage has no negative effect on manufacturing precision.

The present invention makes it possible, for the first time, for a first material component to be injected in a first cavity of an injection mold and to remove said first material component, before the material has cured or completely hardened, from the first cavity. Then, after release, a second component of another material is injected around the first material, either in a second cavity of the first injection mold or a second injection mold, so as to obtain a strong mechanical connection between the first and second material components.

The first material component in the first cavity is injected on a support, which is designed to transport or convey partly plastic material. Following injection of the first phase, the support with the partly plastic material of the first component is removed from the first cavity and introduced into the second cavity. The material of the second component is injected and positively joined to the first component. Prior to the injection of the material of the second component, there is a release of the material of the first component. This is a mechanical process wherein, by means of a slider or a functionally equivalent element, a certain area or surface of the first material component is freed, so that the material of the second component in this area engages in undercutting manner around the material of the first component following the second injection process. As a result of the thus formed mechanical stop, a positive connection is obtained between the first material component and the second material component. This release preferably takes place in a very large-area manner.--

UNITED STATES PATENT AND TRADEMARK OFFICE
CERTIFICATE OF CORRECTION

PATENT NO. : 6,464,921 B1
DATED : October 15, 2002
INVENTOR(S) : Armbruster

It is certified that error appears in the above-identified patent and that said Letters Patent is hereby corrected as shown below:

Column 2,
Line 19, after "other" insert -- hand --.
Line 21, delete "The invention disclosed here" and insert -- The present invention --.
Line 27, after "produced.", insert the centered heading -- BRIEF DESCRIPTION OF THE DRAWINGS" --.
Line 33, delete "the" and insert -- shows a --.
Line 34, after "process.", insert the centered heading -- DETAILED DESCRIPTION OF THE PREFERRED EMBODIMENT --.
Line 42, delete "are" and insert -- will --.
Line 43, delete "meltable or fusible" and insert -- melt, fuse, or bond --.
Line 45, delete "round" and insert -- , or extends around, --.
Line 49, after "layer 3." insert -- The inner layer is essentially captured by the outer layer. --.
Lines 57 and 67, delete "mould" and insert -- mold --.
Line 57, delete "whilst" and insert -- while --.
Line 59, delete "demouldable" and insert -- demoldable --.
Line 60, delete "demoulded" and insert -- demolded --.
Line 63, delete "demoulding" and insert -- demolding --.

Column 3,
Line 1, delete "according to" and insert -- shown in --.
Line 1, delete "mould" and insert -- mold --.
Line 11, after "runner", insert -- or port --.
Line 14, delete "plastics" and insert -- plastic --.
Line 14, delete "said" and insert -- the --.
Lines 22 and 33, delete "mould" and insert -- mold --.
Line 24, delete "runner 26" and insert -- runner or port 26, --.
Line 25, delete "round" and insert -- around --.
Line 27, after "face", insert -- , -- (comma).
Line 28, after "(cf. FIG. 1)", insert -- , -- (comma).
Line 32, after "is", insert -- , -- (comma).
Line 32, after "practice", insert -- , -- (comma).
Line 40, delete "The" and insert -- Also, the --.
Line 41, after "support", insert -- , thereby saving material costs --.

UNITED STATES PATENT AND TRADEMARK OFFICE
CERTIFICATE OF CORRECTION

PATENT NO. : 6,464,921 B1
DATED : October 15, 2002
INVENTOR(S) : Armbruster

It is certified that error appears in the above-identified patent and that said Letters Patent is hereby corrected as shown below:

<u>Column 4,</u>
Line 1, delete "The here described, very rapidly performed manufacturing process is additionally, and as a function of the dimensions of the tube shoulder 1 to be manufactured, controlled by the cooling of the core 14 and the injection mould 1." and insert -- Optionally, the core 14 and mold 1 may be cooled to further control and speed the manufacturing process. --.
Line 9, delete "e.g." and insert -- , for example,--.

Signed and Sealed this

Eighteenth Day of March, 2003

JAMES E. ROGAN
*Director of the United States Patent and Trademark Office*